No. 705,707. Patented July 29, 1902.
J. G. ROSSMAN.
ADJUSTABLE BRACE OR SUPPORT FOR MOVABLE STRUCTURES.
(Application filed Nov. 7, 1901.)
(No Model.)

WITNESSES:
Thos. Wilson
A. M. Morris

INVENTOR:
J. G. Rossman,
BY
ATTORNEYS.

UNITED STATES PATENT OFFICE.

JAMES GILLESPIE ROSSMAN, OF BOSTON, MASSACHUSETTS.

ADJUSTABLE BRACE OR SUPPORT FOR MOVABLE STRUCTURES.

SPECIFICATION forming part of Letters Patent No. 705,707, dated July 29, 1902.

Application filed November 7, 1901. Serial No. 81,482. (No model.)

*To all whom it may concern:*

Be it known that I, JAMES GILLESPIE ROSSMAN, a citizen of the United States, and a resident of Boston, in the county of Suffolk and State of Massachusetts, have invented certain new and useful Improvements in Adjustable Braces or Supports for Movable Structures, of which the following is a specification.

The object of this invention is to provide a cheap, simple, and universally-applicable support, bracket, or brace adapted to be used in connection with and for holding up fences, scenery-partitions, or movable walls or objects, so that it can be readily applied and easily detached or changed in position.

A further object is to so arrange it that it will afford adjustability to the object supported by the brace.

It comprises a bar made of any suitable material, preferably of wrought-iron, provided at each end with a partial bend and having an aperture through the same or other means for fastening the same to the object or to the foundation and having midway between the ends means whereby a brace may be attached thereto, said brace extending to the foot or base of the object to be supported and attached thereto and held in the desired position, as will now be set forth in detail.

Figure 1:
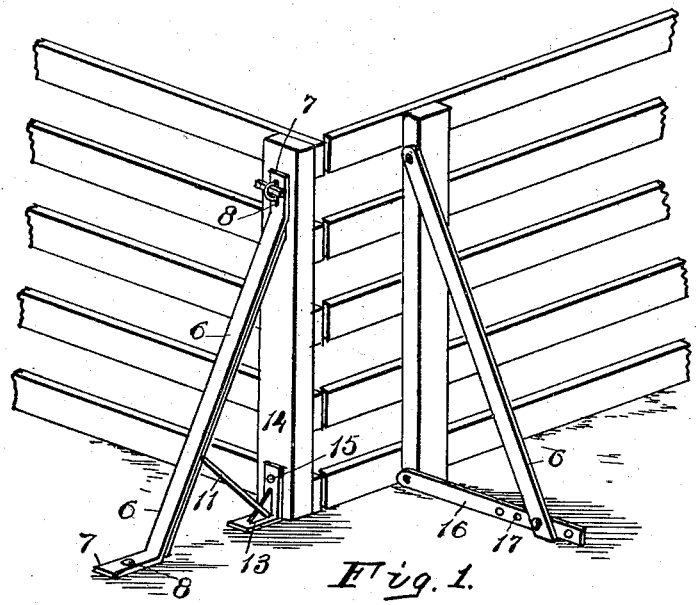
Figure 2:
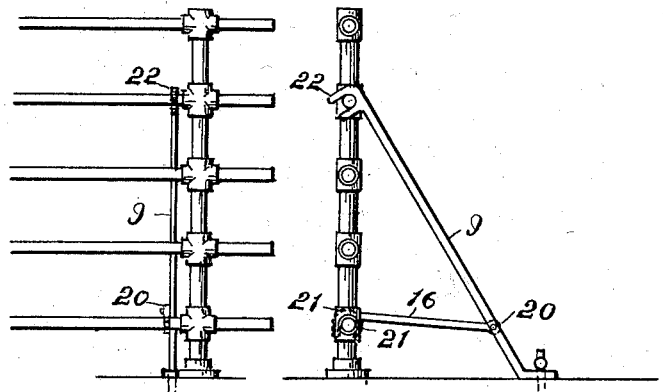
Figure 3:
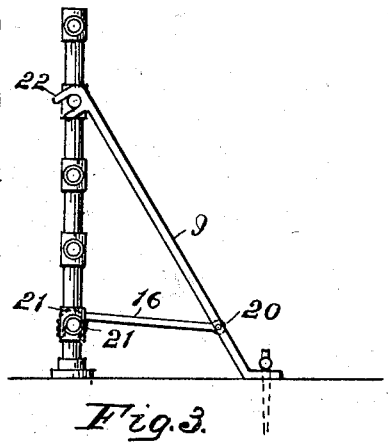
Figure 4:
Figure 5:

In the drawings, Figure 1 is a perspective view of a fence provided with two forms of my improved adjustable brace or support; Fig. 2, a side view of a metal fence or structure, showing another modified form of the adjustable brace attached thereto; Fig. 3, an end view of same; Fig. 4, a side view of the main brace, and Fig. 5 a view of the auxiliary brace.

In constructing my invention I prepare a main brace 6, which is preferably made T-shaped in cross-section to give it the requisite strength and lightness. Each end is turned at an angle, as shown at 7, and provided with a hole or aperture 8. In this form it is adapted for attachment to fences, screens, scenery, and similar objects. It may, however, be made with forked or hooked ends, as shown by the main brace 9 in Fig. 3, or in any other manner best adapted for attachment to an object. Along the body of the main brace is a series of holes 10, and an auxiliary brace 11 has one of its right-angled limbs 12 secured in one of the holes 10, the other end of this auxiliary brace having its right-angled bend attached to a footpiece 13, which rests on the ground at the base of the post 14 and is attached to the latter by a pin or screw 15 or otherwise. This footpiece 13 represents simply one form of attachment for the auxiliary brace 11. In Fig. 1 the brace 16 is shown hinged by a pin to the post at the base, the outer end of the auxiliary brace having a series of holes 17 to provide for the adjustment.

In Fig. 3 the auxiliary brace is hinged to the main brace 19 at 20, and the other end of the auxiliary brace has a bifurcated end 21 at right angles to the body of the brace, so that the main brace is held in rigid relation to the fence. The upper end of the main brace has also a bifurcated end 22, which is secured to one of the upper bars of the fence or structure.

It is obvious that any desired form of attachment to the object or to the ground may be provided without departing from the spirit of my invention, which resides in the hinging of an auxiliary brace to the main body of the brace, as shown.

What I claim as new is—

A brace for portable objects comprising a main brace with bent ends, each having a hole, the body of said brace having a series of holes in combination with an auxiliary brace having ends bent at right angles, and a base for attachment to the lower end of the portable structure and connected by the auxiliary brace with the main brace, as set forth.

Signed at Atlanta, in the county of Fulton and State of Georgia, this 19th day of October, A. D. 1901.

JAMES GILLESPIE ROSSMAN.

Witnesses:
 I. B. CLARKE,
 HARRY FLYNN.